(12) United States Patent
Li et al.

(10) Patent No.: US 11,304,371 B2
(45) Date of Patent: Apr. 19, 2022

(54) LONGITUDINAL AXIAL FLOW DRUM STRUCTURE HAVING ADJUSTABLE THRESHING DIAMETER

(71) Applicant: Jiangsu University, Jiangsu (CN)

(72) Inventors: Yaoming Li, Jiangsu (CN); Zhan Su, Jiangsu (CN); Zhong Tang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 100 days.

(21) Appl. No.: 16/763,234

(22) PCT Filed: Mar. 28, 2018

(86) PCT No.: PCT/CN2018/080757
§ 371 (c)(1),
(2) Date: May 12, 2020

(87) PCT Pub. No.: WO2019/153450
PCT Pub. Date: Aug. 15, 2019

(65) Prior Publication Data
US 2020/0329641 A1    Oct. 22, 2020

(30) Foreign Application Priority Data

Feb. 8, 2018  (CN) .......................... 201810126113.4

(51) Int. Cl.
*A01F 12/22* (2006.01)
*A01F 7/06* (2006.01)
*A01F 12/18* (2006.01)

(52) U.S. Cl.
CPC ................ *A01F 12/22* (2013.01); *A01F 7/06* (2013.01); *A01F 12/181* (2013.01)

(58) Field of Classification Search
CPC ........... A01F 12/22; A01F 12/181; A01F 7/06
See application file for complete search history.

(56) References Cited

U.S. PATENT DOCUMENTS 5,480,351 A * 1/1996 Coleman ................. A01F 12/22
460/122
6,802,771 B2 * 10/2004 Schwersmann ....... A01F 12/442
460/109

(Continued)

FOREIGN PATENT DOCUMENTS

| CN | 2862656 | 1/2007 |
|---|---|---|
| CN | 201146698 | 11/2008 |

(Continued)

OTHER PUBLICATIONS

"International Search Report (Form PCT/ISA/210) of PCT/CN2018/080757", dated Nov. 8, 2018, with English translation thereof, pp. 1-6.

*Primary Examiner* — Alicia Torres
*Assistant Examiner* — Matthew Ian Neal
(74) *Attorney, Agent, or Firm* — JCIP Global Inc.

(57) ABSTRACT

A longitudinal axial flow drum structure having an adjustable threshing diameter includes a threshing drum, a transmission mechanism, a diameter regulating mechanism and a regulating steel wire pulling mechanism. The transmission mechanism delivers power to regulating devices of the diameter regulating mechanism. The diameter regulating mechanism is connected with the transmission mechanism and the threshing drum to enable threshing diameter regulation. The transmission mechanism and the diameter regulating mechanism are installed inside a feeding cylinder of the threshing drum. The threshing diameter is regulated in real-time and stepless manner by adjusting the regulating steel wire pulling mechanism to pull a regulating steel wire in the transmission mechanism.

10 Claims, 4 Drawing Sheets

(56) References Cited

U.S. PATENT DOCUMENTS

| | | | |
|---|---|---|---|
| 6,958,012 B2* | 10/2005 | Duquesne | A01F 12/28 460/109 |
| 7,153,204 B2* | 12/2006 | Esken | A01F 12/28 460/109 |
| 2011/0151951 A1 | 6/2011 | Regier et al. | |
| 2016/0295802 A1* | 10/2016 | De Witte | A01F 12/26 |
| 2020/0077582 A1* | 3/2020 | Xu | A01F 7/04 |
| 2021/0212260 A1* | 7/2021 | Mitsui | A01F 12/22 |
| 2021/0368679 A1* | 12/2021 | Mitsui | A01D 41/1252 |

FOREIGN PATENT DOCUMENTS

| | | | |
|---|---|---|---|
| CN | 201323784 | 10/2009 | |
| CN | 201323787 | 10/2009 | |
| CN | 101608979 | 12/2009 | |
| CN | 201438819 | 4/2010 | |
| CN | 105660057 | 6/2016 | |
| WO | WO-2019088051 A1 * | 5/2019 | A01F 12/22 |

* cited by examiner

US 11,304,371 B2

LONGITUDINAL AXIAL FLOW DRUM STRUCTURE HAVING ADJUSTABLE THRESHING DIAMETER

CROSS-REFERENCE TO RELATED APPLICATION

This application is a 371 of international application of PCT application serial no. PCT/CN2018/080757, filed on Mar. 28, 2018, which claims the priority benefit of China application no. 201810126113.4, filed on Feb. 8, 2018. The entirety of each of the above mentioned patent applications is hereby incorporated by reference herein and made a part of this specification.

BACKGROUND

Technical Field

The invention involves the technical field of the grain threshing and separating device installed in the combine harvester. To be specific, the invention discloses a longitudinal axial flow drum structure having an adjustable threshing diameter.

Description of Related Art

As for the combine harvester, the threshing gap exerts great impact on grain threshing quality. In general, the less the threshing gap is, the better the threshing performance gets while the higher the damage rate hits. Conversely, the damage rate falls, but the threshing performance worsens. Considering different requirements of threshing gap specific to varieties of grains that are different in moisture content, the variable threshing drum diameter enables effective regulation of threshing gap. The existing approach of regulating the threshing drum diameter is to regulate the threshing diameter by changing positions of the threshing tooth rods in the supporting plates that is achieved by boring threaded holes at different positions of the supporting plates along the radius and fixing the connecting bases of the threshing tooth rods relying on bolts. Here are two examples, the variable diameter-featured corn tangential flow threshing drum (CN105660057A) invented by Zhang Kun et al and the variable diameter threshing drum (CN200520085850.2) invented by Wang Legang et al, whose threshing diameter is regulated by changing connection between the connecting bases of the threshing tooth rods and the threaded hole groups in the supporting plates. The threshing drum diameter (threshing gap) keeps unchanged when the combine harvester is working, and the traditional drum diameter regulating device of this kind works by opening the threshing top cover and regulating the relative positions of connecting bases of the threshing tooth rods in the supporting plates when the combine harvester has to be shut down. Because of limited threaded hole groups, the threshing drum only enables stepped regulation of threshing diameter. Therefore, such approach requires longer time and more efforts, leading to low work efficiency.

SUMMARY

In order to tackle the failure of real-time and stepless regulation of the threshing diameter when the combine harvester is working, the invention discloses a drum device enabling real-time and stepless regulation of the threshing diameter when the combine harvester is working. Thanks to the invention, the combine harvester has the ability of regulating threshing diameter or threshing gap in real-time and stepless manner when harvesting varieties of grains that are different in moisture content, reaching the optimal threshing work conditions. Hence, it not only enhances grain threshing quality but also saves labor force effectively and lifts operation efficiency of the combine harvester.

The invention realizes the above technical purposes by virtue of the following technical means.

A longitudinal axial flow drum structure having an adjustable threshing diameter includes a threshing drum, a transmission mechanism and a diameter regulating mechanism. The diameter regulating mechanism comprises regulating turntables, crank linkages and an adapter sleeve. The threshing drum includes a drum shaft, and a feeding wheel, a front supporting plate, a middle supporting plate, a rear supporting plate and a plurality of threshing tooth rods that are installed in the drum shaft in sequence along a feeding direction from front to rear. The middle supporting plate is arranged with several U-shaped grooves in its periphery. All the front supporting plate, the middle supporting plate and the rear supporting plate are installed with regulating turntables that are fixedly connected to each other relying on the adapter sleeves sleeving on the drum shaft. The middle supporting plate is bored with several waist-shaped through holes. The regulating turntables arrayed along both sides of the middle supporting plate are connected through bolts passing through the waist-shaped through holes. One end of the crank linkage is fixed in the regulating turntable, while the other end of the crank linkage is connected with the threshing tooth rod inserted into the U-shaped grooves. The transmission mechanism, serving as a power source of the drum structure, is fixed along with the power source of the diameter regulating mechanism in the front supporting plate, the middle supporting plate and the rear supporting plate.

Further, a section from a front end of the drum shaft to the front supporting plate is hollow. Two radial through holes are opened symmetrically on both sides of the drum shaft. The transmission mechanism is a worm and gear mechanism, and includes regulating steel wires, steering wheels, a worm gear, a worm, a supporting ring and a bearing seat. The supporting ring is concentrically installed together with the drum shaft in the front supporting plate. The worm gear is installed in the supporting ring. The worm, meshing with the worm gear, is fixed in the front supporting plate at both ends with two bearing seats. The two steering wheels are respectively located below both ends of the worm, and at two sides of the worm gear, and keep parallel to the radial through holes on the both sides of the drum shaft. The two regulating steel wires pass into a hollow section via a center of the front end of the drum shaft and pass out of the two radial through holes respectively, and bypass the steering wheels to connect with the worm at both ends respectively in twined manner. The front supporting plate is bored with several waist-shaped through holes. The worm gear and the regulating turntable in the other side of the front supporting plate are connected by bolts that pass through the waist-shaped through holes.

Further, a regulating steel wire pulling mechanism is further included. The regulating steel wire pulling mechanism includes a left rotating lever, a right rotating lever, a center shaft of the left rotating lever, a center shaft sleeve of the right rotating lever and regulating handles. The left rotating lever and the right rotating lever are connected with two regulating steel wires at their lower ends respectively. The left rotating lever is connected with the center shaft of the left rotating lever relying on the revolute pair. The right rotating lever is connected with the center shaft sleeve of the right rotating lever through a revolute pair, and the right rotating lever is installed in the center shaft of the left rotating lever. The two regulating handles are connected with the center shaft of the left rotating lever and the center shaft sleeve of the right rotating lever respectively.

Further, a circle diameter of the hollow section in the front end of the drum shaft measures 15~20 mm. The two radial through holes are arranged in places which are 240 mm and 260 mm from the front end of the drum shaft respectively, and have a diameter measuring 10~15 mm.

Further, a helix angle of the worm is less than 5 degrees.

Further, a side surface of the front supporting plate and a side surface of the rear supporting plate that face each other are provided with several radially-extended slide rails, and both ends of the threshing tooth rod are engaged with the slide rails.

Further, tooth rod travelers are welded at both ends of the threshing tooth rod, which is engageable into grooves of the slide rails.

Further, a width of the U-shaped groove has a same value with a diameter of the threshing tooth rod. A depth of the U-shaped groove measures 50~60 mm.

Further, an outer diameter of the worm gear measures 200~250 mm; a tooth length of the worm measures 55~65 mm; an outer diameter of the regulating turntable measures 150~200 mm; a length of the crank linkage measures 150~200 mm; a length of the slide rail measures 50~60 mm; an adjustable range of the threshing diameter measures 10~30 mm.

Further, each regulating turntable shares same number of the connected threshing tooth rods.

The transmission mechanism and the diameter regulating mechanism of the longitudinal axial flow drum structure having adjustable threshing diameter as described in the invention rotate along with the front supporting plate, the middle supporting plate and the rear supporting plate under the drive of the drum shaft in threshing process. When it is needed to regulate the threshing drum diameter, the regulating turntable of the diameter regulating mechanism, driven by the transmission mechanism, moves relative to the front supporting plate, the middle supporting plate and the rear supporting plate, driving the motion of the crank linkage. As the moving trajectory of the threshing tooth rod depends on the U-shaped groove in the middle supporting plate, the rod is only able to make rectilinear motion along a radial direction of the threshing drum, namely, sliding up and down in the U-shaped grooves, in order to regulate threshing diameter or threshing gap. To be specific, when the transmission mechanism is configured as a worm and gear mechanism, both regulating steel wires are respectively pulled, and rotation of the worm is driven, so as to drive the worm gear to rotate and to enable rotation of the regulating turntable, thereby realizing real-time and stepless regulation of threshing diameter. When the combine harvester needs to regulate threshing diameter or threshing gap in harvesting varieties of grains that are different in moisture content, the transmission mechanism drives the diameter regulating mechanism to rotate, propelling reciprocating motion of the threshing tooth rod along U-shaped grooves so as to achieve the purpose of real-time and stepless regulation of threshing diameter. Such function enables the threshing gap to conform to the optimal threshing work conditions specific to varieties of grains that are different in moisture, enhancing grain threshing quality. Therefore, the invention is a preferred choice for threshing gap regulation of the threshing and separating device that is installed in the combine harvester.

The invention has the ability of regulating the threshing diameter in real-time and stepless manner when the combine harvester is working. Compared with the traditional stepped regulation of threshing diameter, the real-time and stepless diameter regulation of the invention, more flexible, convenient and efficient, reduces labor force effectively and enhances fluent operation of the combine harvester.

In addition, when the transmission mechanism adopts worm and gear design, the helix angle of the worm is less than 5 degrees and the drum is self-locked effectively after regulation of threshing diameter. That is, merely the two regulating steel wires are used to drive rotation of the worm, so as to drive rotation of the worm gear for triggering rotation of the regulating turntable, and the reverse process is disabled. Such feature, good self-locking performance, ensures no rotation of the threshing tooth rod, the regulating turntable and other relevant mechanisms when applied by external force effectively, freeing the threshing tooth rod from uncontrolled looseness and up/down floating motion when the threshing drum is working, which guarantees threshing quality.

Furthermore, the invention improves trafficability and avoids blockage of materials by controlling the drum threshing diameter. And the installation of the transmission mechanism and the diameter regulating mechanism inside the threshing drum, structurally simple and compact, reduces structural adjustment and occupied space arising from the invention, and cuts down manufacturing cost. Therefore, the invention boasts promising market prospect and competitive power as either axial flow drum or tangential flow is available, contributing to its broad scope of application.

The connection between or among components or parts features dismountable, such as the connection among the transmission mechanism, the diameter regulating mechanism and the threshing device, and the connection between parts of the transmission mechanism and the diameter regulating mechanism. As a result, such feature of dismountable connection makes possible mutually independent design, production, transport, maintenance and replacement of the parts and components of the product, easy and time-saving assembly and disassembly, and convenient operation, thus greatly cutting down production and use costs of parts and components.

DESCRIPTION OF THE EMBODIMENTS

The invention will be further explained combining with the attached drawings and a specific embodiment in the text below.

A longitudinal axial flow drum structure having an adjustable threshing diameter as described in the invention comprises a threshing drum, a transmission mechanism and a diameter regulating mechanism. The transmission mechanism delivers power to regulating devices of the diameter regulating mechanism. The diameter regulating mechanism is connected with the transmission mechanism and the threshing drum, to enable threshing diameter regulation. The transmission mechanism and the diameter regulating mechanism are both installed inside the threshing drum.

Figure 1:
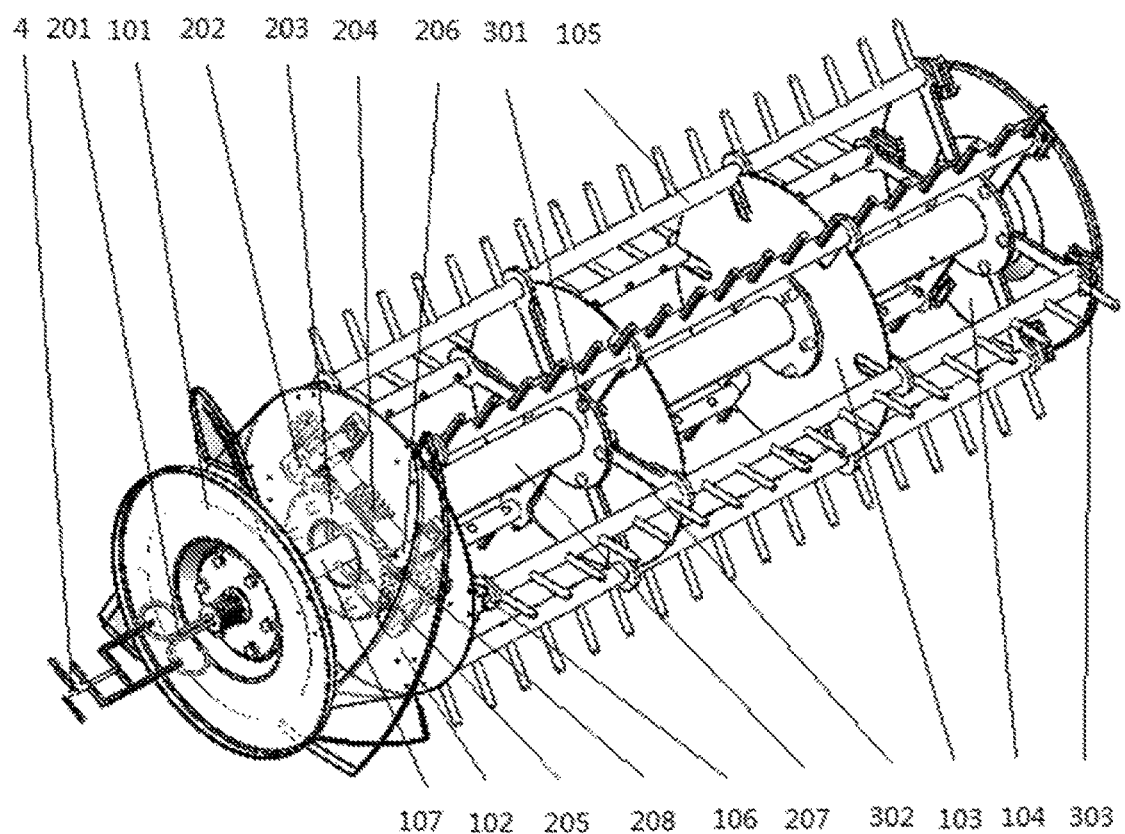
FIG. 1 shows the schematic diagram of a longitudinal axial flow drum structure having an adjustable threshing diameter as described in the invention.
Figure 5:
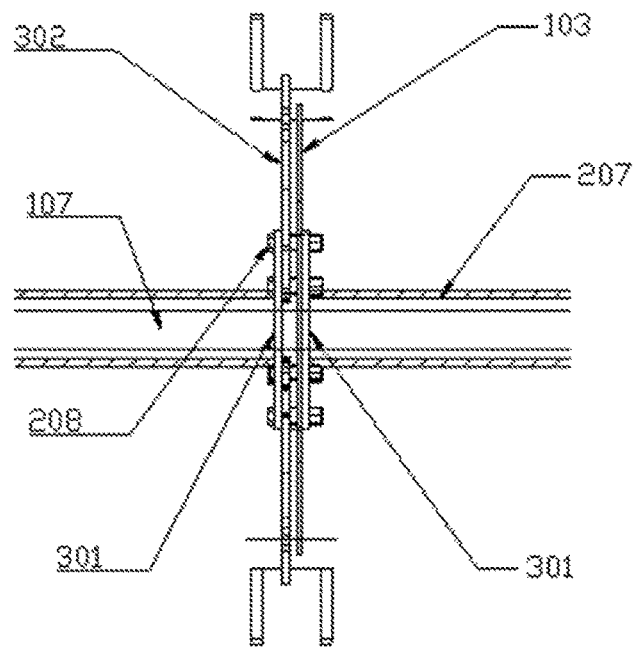
FIG. 5 shows a section view of the regulating mechanisms at two sides of the middle supporting plate.
Figure 6:
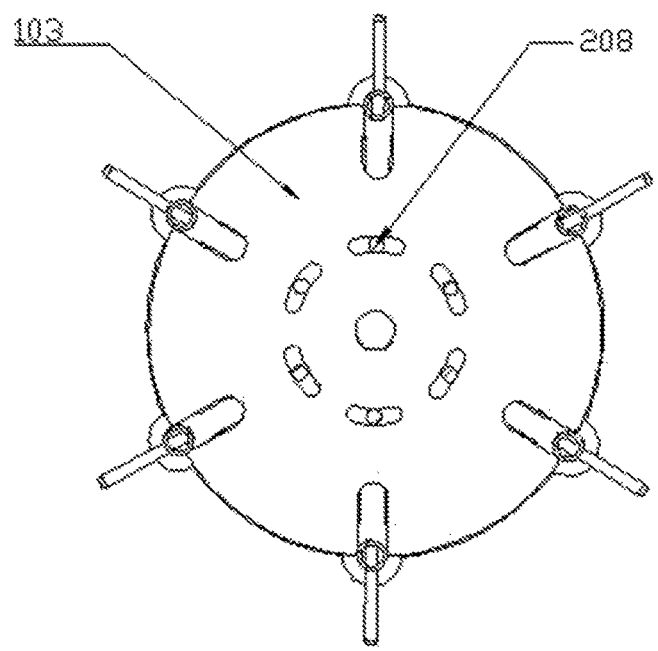
FIG. 6 shows a front view of the regulating mechanisms at two sides of the middle supporting plate.

As shown in FIG. 1, the diameter regulating mechanism comprises regulating turntable 301s, crank linkages 302 and an adapter sleeve 207. The threshing drum includes a drum shaft 107, and a feeder-beater 101, a front supporting plate 102, a middle supporting plate 103, a rear supporting plate 104 and a plurality of threshing tooth rods 105 that are installed in the drum shaft 107 in sequence from the front to the rear along a feeding direction. The middle supporting plate 103 is arranged with several U-shaped grooves in its periphery. All the front supporting plate 102, the middle supporting plate 103 and the rear supporting plate 104 are installed with regulating turntables 301 that are connected to each other and fixed relying on adapter sleeves 207 sleeving on the drum shaft 107. In addition, the middle supporting plate 103 is bored with several waist-shaped through holes through which the bolts are mounted, and the bolts work to connect the regulating turntables 301 arrayed along both sides of the middle supporting plate 103. One end of the crank linkage 302 is fixed in the regulating turntable 301, while the other end f the crank linkage 302 is connected with the threshing tooth rod 105 inserted into the U-shaped grooves, as shown in FIG. 5 and FIG. 6. The transmission mechanism 2, serving as a power source of the drum structure, is fixed along with the power source of the diameter regulating mechanism in the front supporting plate 102, the middle supporting plate 103 and the rear supporting plate 104.

Figure 2:
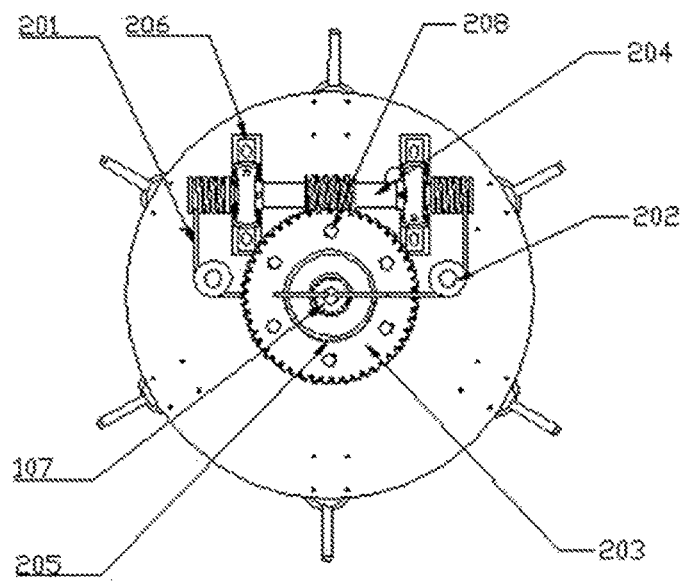
FIG. 2 shows a front view for a structure of a transmission mechanism inside a feeding wheel.
Figure 3:
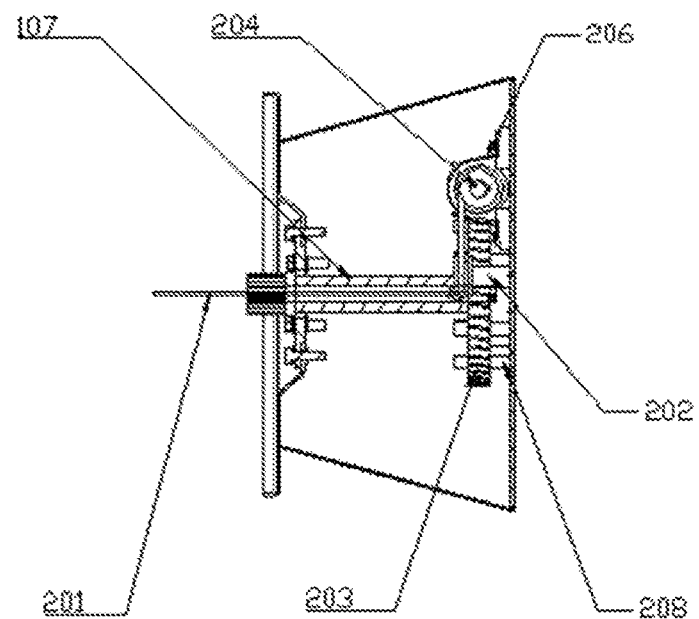
FIG. 3 shows a section view of the transmission mechanism inside the feeding wheel.
Figure 4:
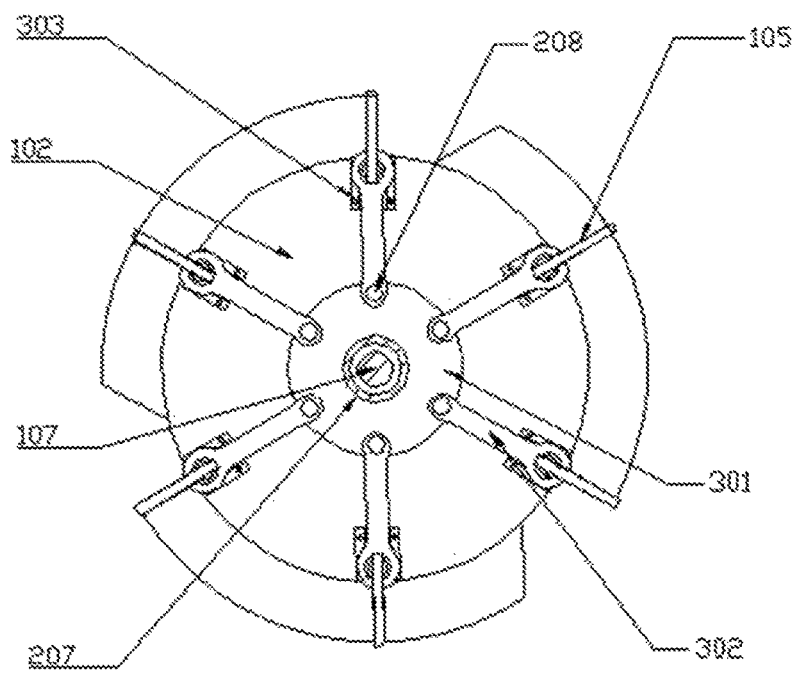
FIG. 4 shows a front view of a front supporting plate and a regulating mechanism.

In the embodiment, the transmission mechanism 2 is a worm and gear mechanism, which is shown in FIG. 2 and FIG. 3. A section from a front end of the drum shaft 107 to the front supporting plate 102 is hollow. Two radial through holes are opened symmetrically on both sides of the drum shaft 107. The transmission mechanism 2 includes regulating steel wires 201, steering wheels 202, a worm gear 203, a worm 204, a supporting ring 205 and bearing seats 206. The supporting ring 205 is concentrically installed together with the drum shaft 107 in the front supporting plate 102. The worm gear 203 is installed in the supporting ring 205. The worm 204, meshing with the worm gear 203, is fixed in the front supporting plate 102 at both ends with two bearing seats 206. Two steering wheels 202 are located below both ends of the worm 203 respectively and at two sides of the worm gear 204, and keep parallel to radial through holes on the both sides of the drum shaft 107. Two regulating steel wires 201 pass into a hollow section via a center of the front end of the drum shaft 107 and pass out of the two radial through holes respectively, and bypass the steering wheels 202 to connect with the worm 204 at both ends respectively in twined manner, thereby enabling left/right rotation of the worm gear 203 when the two regulating steel wires 201 are pulled respectively. The front supporting plate 102 is bored with several waist-shaped through holes. The worm gear 203 and the regulating turntable 301 in the other side of the front supporting plate 102 are connected by the bolts that pass through the waist-shaped through holes, as shown in FIG. 4.

The circle diameter of the hollow in the front end of the drum shaft 107 measures 15~20 mm. Two radial through holes are arranged in such places which are 240 mm and 260 mm from the front end of the drum shaft 107 respectively, and have a diameter measuring 10~15 mm. A helix angle of the worm 204 is less than 5 degrees and the drum is self-locked effectively after regulation of threshing diameter. That is, merely the two regulating steel wires 201 are used to drive rotation of the worm 204, so as to drive rotation of the worm gear 203 for triggering rotation of the regulating turntable 301, and the reverse process is disabled. Such feature, good self-locking performance, ensures no rotation of the threshing tooth rod 105, the regulating turntable 301 and other relevant mechanisms when applied by external force effectively, freeing the threshing tooth rod 105 from uncontrolled looseness and up/down floating motion when the threshing drum is working, which guarantees threshing quality.

Figure 9:
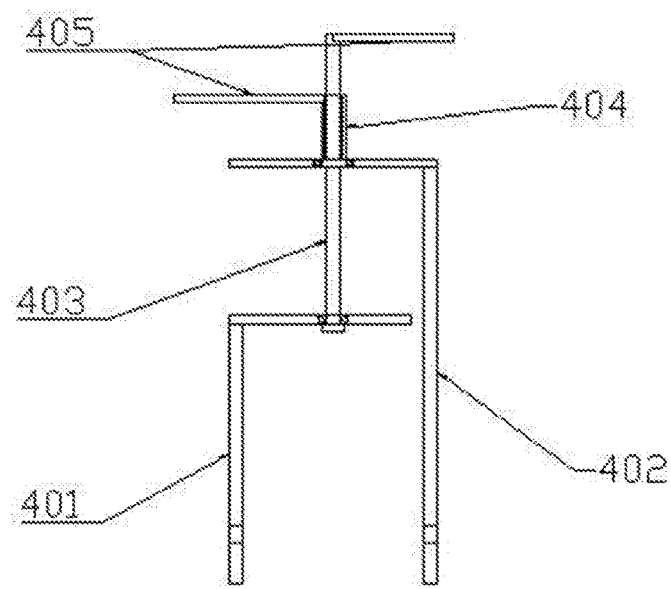
FIG. 9 shows a schematic diagram for the structure of the regulating steel wire pulling mechanism.

Further, the invention includes the regulating steel wire pulling mechanism 4, as shown in FIG. 9. The pulling mechanism 4 includes a left rotating lever 401, a right rotating lever 402, a center shaft 403 of the left rotating lever, a center shaft sleeve 404 of the right rotating lever and regulating handles 405. The left rotating lever 401 and the right rotating lever 402 are connected with two regulating steel wires 201 at their lower ends respectively. The left rotating lever 401 is connected with the center shaft 403 of the left rotating lever relying on a revolute pair. The right rotating lever 402 is connected with and the center shaft sleeve 404 of the right rotating lever through a revolute pair, the right rotating lever 404 is installed in the center shaft 403 of the left rotating lever. The two regulating handles 405 are connected with the center shaft 403 of the left rotating lever and the center shaft sleeve 404 of the right rotating lever respectively. The left rotating lever 401 rotates around the center shaft 403 of the left rotating lever, while the right rotating lever 402 rotates around the center shaft sleeve 404 of the right rotating lever which jackets the center shaft 403 of the left rotating lever, with the left rotating lever 401 below the right rotating lever 402. In rotating process of the threshing drum, both the left rotating lever 401 and the right rotating lever 402 are connected with two regulating steel wires 201, and rotate relatively along with the regulating steel wires at the same speed around such components, the center shaft 403 of the left rotating lever and the center shaft sleeve 404 of the right rotating lever, as do not rotate. The regulating steel wire 201 is pulled by pulling regulating handles 405 of left and right center shafts when the drum is rotating to regulate the threshing diameter.

Figure 7:
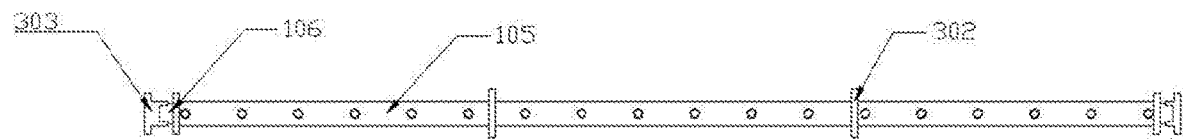
FIG. 7 shows an assembly drawing of the threshing tooth rod, the crank linkage and the slide rail.
Figure 8:
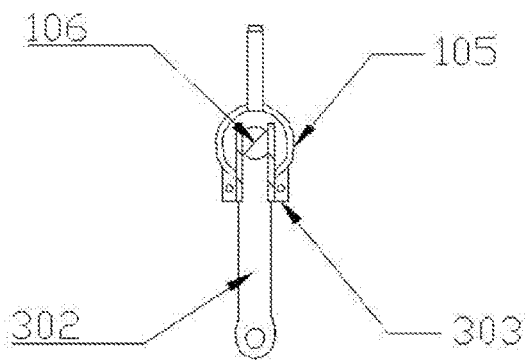
FIG. 8 shows a front view indicating assembly relationship of the threshing tooth rod, the crank linkage and the slide rail.

Further, a side surface of the front supporting plate 102 and a side surface of the rear supporting plate 104 that face each other are furnished with several radially-extended slide rails 303. The threshing tooth rods 105 are 6 concentric steel tubes evenly distributed outside the threshing drum. Both ends of the threshing tooth rod 105 are inserted into the slide rail 303 for guiding the motion of the threshing tooth rod 105. The tooth rod travelers 106 are welded at both ends of the threshing tooth rod 105, which may move into the grooves of the slide rails 303 when the drum structure works, thus bettering stability of connection between the threshing tooth rod 105 and the slide rail 303, as shown in FIG. 8. The middle supporting plate 103 is bored with 6 U-shaped grooves along its edge, with hole positions the same with those of the threshing tooth rods 105. A width of the U-shaped groove has a same value with a diameter of the threshing tooth rod 105 and a depth of the U-shaped groove measures 50~60 mm. The threshing tooth rod 105 is able to move up and down inside the U-shaped groove. Six crank linkages 302 are fixedly connected with the regulating turntables 301 at their lower ends relying on connecting bots 208, and the crank linkages 302 are fixedly connected to the threshing tooth rods 105 at their upper ends thanks to the ring structure in the upper ends of the crank linkage 302, as shown in FIG. 7. An inner diameter of the crank linkage 302 is equal to a diameter of the threshing tooth rod 105, the threshing tooth rod 105 passes through an upper part of the crank linkage 302 and is welded jointly for fixation. In threshing process of the drum, the crank linkage works to not only fix and support the threshing tooth rod, but also protect the threshing tooth rod from moving along the slide rail when applied by external force. The regulating turntable 301 rotates to drive the crank linkage 302 to move in a tilting manner, and the upper end of the crank linkage 302 drives the threshing tooth rod 105 to make reciprocating motion along the slide rail 303, thus regulation of the threshing diameter is achieved.

The specific working process of the longitudinal axial flow drum structure having adjustable threshing diameter is detailed as follows. When the combine harvester needs to reduce the threshing gap, namely, to increase the threshing diameter of the drum, either regulating steel wire 201 pulled by operating the pulling mechanism of the regulating steel wire works to drive the worm and gear mechanism bypassing the steering wheel 202. The worm gear 203 rotates to drive rotation of the regulating turntable 301 along with motion of the crank linkage 302 in the regulating turntable 301. A string of such acts drive the threshing tooth rod 105 to move outwards along the slide rail 303, increasing the threshing diameter of the drum. On the contrary, when the combine harvester needs to increase the threshing gap, namely, to reduce the threshing diameter of the drum, the other regulating steel wire 201 pulled by operating the pulling mechanism of the regulating steel wire works to drive the regulating turntable 301 to move toward the opposite direction via the worm and gear mechanism. As a result, the threshing tooth rod 105 moves inwards along the slide rail 303, reducing the threshing diameter of the drum. In threshing process of the drum, the crank linkage 302 works to not only fix and support the threshing tooth rod 105, but also protect the threshing tooth rod 105 from moving along the slide rail 303 when applied by external force. Relying on the worm and gear mechanism, the drum is self-locked effectively after regulation of threshing diameter. That is, merely the two regulating steel wires 201 are used to drive rotation of the worm 204, and to drive rotation of the worm gear 203 to regulate the threshing diameter. However, the reverse process is disabled. Such feature, good self-locking performance, ensures no rotation of the threshing tooth rod 105, the regulating turntable 301 and other relevant mechanisms effectively when the external force is applied, freeing the threshing tooth rod 105 from uncontrolled looseness and up/down floating motion when the threshing drum is working, which guarantees threshing quality.

The longitudinal axial flow drum structure has the ability of regulating the threshing diameter in real-time and stepless manner when the combine harvester is working, thus enabling the threshing gap to conform to the optimal threshing conditions specific to varieties of grains that are different in moisture. Compared with the traditional stepped regulation of threshing diameter, the effective diameter regulation of the invention by only pulling the two regulating steel wires, convenient and efficient, reduces labor force effectively and enhances fluent operation of the combine harvester.

In addition, other structural forms that are able to deliver power to the regulating turntable 301 are available for the transmission mechanism 2 as described in the invention.

The embodiment described in the text is a preference, but not the only choice, for the invention. Any improvement, substitution or variation of this invention, which the technicians in this field are able to make obviously, not deviating from the essential contents of the invention, is still within protection scope of this invention.

What is claimed is:

1. A longitudinal axial flow drum structure having an adjustable threshing diameter, the longitudinal axial flow drum structure comprising a threshing drum, a transmission mechanism and a diameter regulating mechanism, wherein the diameter regulating mechanism comprises a plurality of regulating turntables, a plurality of crank linkages and an adapter sleeve, the threshing drum comprises a drum shaft, and a feeding wheel, a front supporting plate, a middle supporting plate and a rear supporting plate that are installed in the drum shaft in sequence along a feeding direction from front to rear, and a plurality of threshing tooth rods; the middle supporting plate is provided with a plurality of U-shaped grooves in a periphery thereof, the front supporting plate, both sides of the middle supporting plate and the rear supporting plate are installed with the regulating turntables that are fixedly connected to each other through the adapter sleeve sleeved over the drum shaft, the middle supporting plate is bored with a plurality of through holes, the regulating turntables arrayed along the both sides of the middle supporting plate are connected via bolts passing through the through holes; one end of each of the crank linkages is fixed in a corresponding one of the regulating turntables, the other end of each of the crank linkages is connected with a respective one of the threshing tooth rods inserted into a respective one of the U-shaped grooves;

the transmission mechanism, serving as a power source of the diameter regulating mechanism, is fixed on the front supporting plate.

2. The longitudinal axial flow drum structure having an adjustable threshing diameter as claimed in claim 1, wherein the drum shaft has a hollow section from a front end of the drum shaft to the front supporting plate, two radial through holes are opened symmetrically on both sides of the hollow section of the drum shaft; the transmission mechanism is a worm and gear mechanism and includes two regulating steel wires, two steering wheels, a worm gear, a worm, a supporting ring and two bearing seats; the supporting ring is concentrically installed together with the drum shaft in the front supporting plate, the worm gear is installed in the supporting ring, the worm, meshing with the worm gear, is fixed in the front supporting plate at both ends with the two bearing seats, the two steering wheels are respectively located below both ends of the worm and at two sides of the wonii gear, and keep parallel to the radial through holes on the both sides of the drum shaft; the two regulating steel wires pass into the hollow section via the front end of the drum shaft and pass out of the two radial through holes respectively, and bypass the steering wheels to connect with the worm at both ends respectively in twined manner, the front supporting plate is bored with a plurality of through holes, the worm gear and the regulating turntable in the other side of the front supporting plate are connected by bolts that pass through the through holes.

3. The longitudinal axial flow drum structure having an adjustable threshing diameter as claimed in claim 2, further comprising a regulating steel wire pulling mechanism, including a left rotating lever, a right rotating lever, a center shaft of the left rotating lever, a center shaft sleeve of the right rotating lever and two regulating handles, wherein lower ends of the left rotating lever and of the right rotating lever are connected with two regulating steel wires thereof respectively, the left rotating lever is connected with the center shaft of the left rotating lever through a revolute pair, the right rotating lever is connected with the center shaft sleeve of the right rotating lever through a revolute pair, the right rotating lever is installed in the center shaft of the left rotating lever, the two regulating handles are connected with the center shaft of the left rotating lever and the center shaft sleeve of the right rotating lever respectively.

4. The longitudinal axial flow drum structure having an adjustable threshing diameter as claimed in claim 2, wherein a circle diameter of the hollow section in the front end of the drum shaft measures 15~20 mm; the two radial through holes are arranged in places which are 240 mm and 260 mm from the front end of the drum shaft respectively, and have a diameter measuring 10~15 mm.

5. The longitudinal axial flow drum structure having an adjustable threshing diameter as claimed in claim 2, wherein a helix angle of the worm is less than 5 degrees.

6. The longitudinal axial flow drum structure having an adjustable threshing diameter as claimed in claim 1, wherein a side surface of the front supporting plate and a side surface of the rear supporting plate that face each other are provided with a plurality of radially-extended slide rails, and both end portions of each of the threshing tooth rods are respectively engaged with the slide rails.

7. The longitudinal axial flow drum structure having an adjustable threshing diameter as claimed in claim 6, wherein tooth rod travelers are welded at both ends of each of the threshing tooth rods, which is engageable into grooves of the slide rails.

8. The longitudinal axial flow drum structure having an adjustable threshing diameter as claimed in claim 6, wherein each of the U-shaped grooves has a width in a peripheral direction and a depth in a radial direction, the width is the same as a diameter of the threshing tooth rods, and the depth of each of the U-shaped grooves measures 50~60 mm.

9. The longitudinal axial flow drum structure having an adjustable threshing diameter as claimed in claim 8, wherein an outer diameter of the worm gear measures 200~250 mm; a tooth length of the worm measures 55~65 mm; an outer diameter of the regulating turntable measures 150~200 mm; a length of the crank linkage measures 150~200 mm; a length of the slide rail measures 50~60 mm; an adjustable range of the threshing diameter measures 10~30 mm.

10. The longitudinal axial flow drum structure having an adjustable threshing diameter as claimed in claim 8, wherein each regulating turntable shares same number of the connected threshing tooth rods.

* * * * *